June 24, 1958 W. GRAHAM 2,840,639

METHOD AND APPARATUS FOR SIGNAL PRESENTATION

Filed Dec. 31, 1952 2 Sheets-Sheet 1

INVENTOR
WALTON GRAHAM
BY
Ernest Fanwick
ATTORNEY

INVENTOR
WALTON GRAHAM
BY Ernest Fanwick
ATTORNEY

United States Patent Office 2,840,639

Patented June 24, 1958

2,840,639

METHOD AND APPARATUS FOR SIGNAL PRESENTATION

Walton Graham, North Bergen, N. J., assignor to International Telephone and Telegraph Corporation, a corporation of Maryland Application December 31, 1952, Serial No. 329,031

5 Claims. (Cl. 179—1)

This invention relates to methods and apparatus for signal presentation and more particularly to methods and apparatus for the presentation of an aural signal to enhance the signal-to-noise ratio.

The threshold level of a tone in noise (the primaudible level) is determined primarily by the noise power at frequencies adjacent to that of the tone. The width of the frequency band of noise, effective in masking the desired tone, is called the critical bandwidth of the ear at the frequency of the tone. The critical bandwidth is defined as that width of noise around the tone frequency beyond which the masking effect is constant, or the critical bandwidth may be defined as that bandwidth of noise having the same power as the signal at primaudible.

The critical bandwidth of the human ear varies as a function of frequency, that is, a person of normal hearing is able to detect, in the presence of noise, a signal of a given frequency whereas another signal of equal power but at another frequency may be inaudible even though the signal-to-noise ratios of both signals are identical.

One of the objects of this invention, therefore, is to provide methods and apparatus of aural signal presentation which enhance the signal-to-noise ratio.

Another object of this invention is to provide methods and apparatus to make audible a tone which is below the primaudible level.

A feature of this invention is the provision of means for dividing a given frequency bandwith into a plurality of sub-bands which are each modulated to fall in a predetermined frequency range at the lower end of the frequency spectrum where they are recorded for a certain time interval. These bands are then multiplied with a consequent signal-to-noise improvement, so they they fall in an advantageous critical bandwidth of the human ear and are aurally presented in succession in a corresponding time interval. The duration of presentation of each sub-band is long compared to the duration of the transient resulting from switching among sub-bands.

The above-mentioned and other features and objects of this invention will become more apparent by reference to the following description taken in conjunction with the accompanying drawings, in which.

Figure 1:
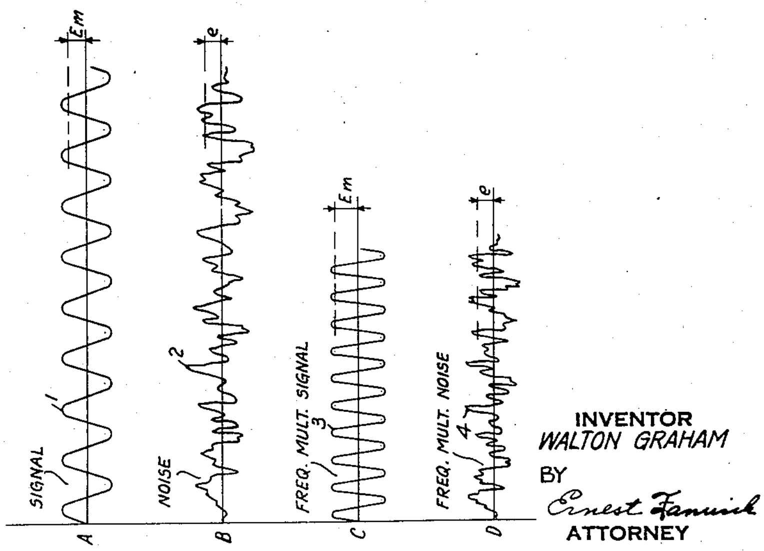
Fig. 1 is a graphic illustration of a set of curves helpful in explaining the principle of signal-to-noise improvement by frequency multiplication.

Referring to Fig. 1, the principle of signal-to-noise improvement by frequency multiplication in accordance with one feature of this invention is shown, wherein the waveform 1 of curve A represents a tone signal at a frequency $f_0$ with R. M. S. voltage represented by $$\frac{e_m}{\gamma 2}$$

and waveform 2 of curve B represents a noise having an R. M. S. voltage $e$ and having a bandwidth of $f_c$. The noise power per cycle may be represented by $$\frac{e^2}{f_c}$$

When the input frequency of the tone wave 1 of curve A is increased by a factor of multiplication "$m$," the average power of the tone remains the same, but the frequency is transformed to $mf_0$ as shown by waveform 3 of curve C. The average power of the noise shown in curve D, waveform 4, is likewise the same, but the bandwidth is increased "$m$" times to $mf_c$. All the energy of the tone signal is present in one critical bandwidth, however the noise energy at frequencies near that of the tone is dispersed over many critical bandwidths. Thus the average noise power in a given critical bandwith is reduced by the factor "$m$" since the product of the noise power per cycle and the new total bandwidth $mf_c$ remains the same. The noise power per cycle after multiplication may be represented by $$\frac{e^2}{mf_c}$$

The signal-to-noise ratio in a critical bandwidth is therefore improved by "$m$" times for signals with spectra as narrow as or narrower than the critical bandwidth divided by "$m$." However, since the build up time of the human ear is finite, it is important to insure that the multiplication will not reduce the duration of the multiplied signal below one second for optimum results.

Figure 2:
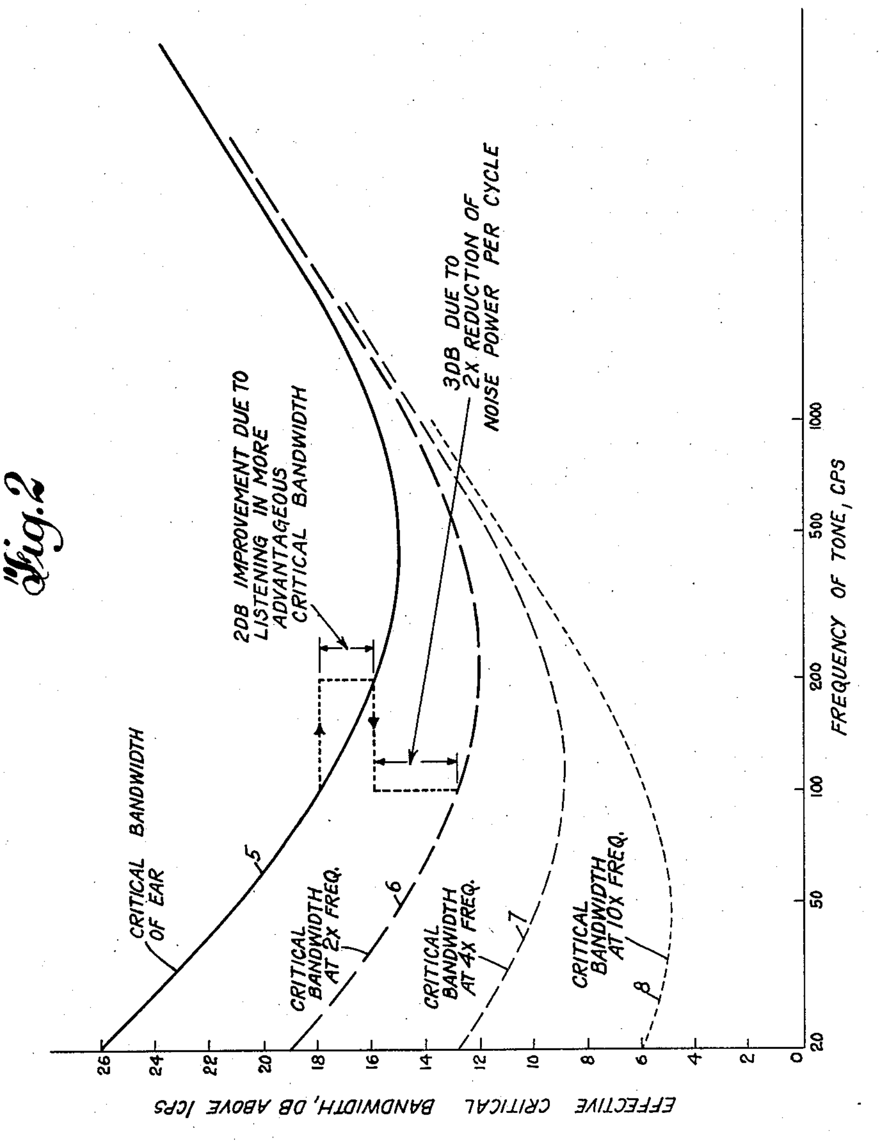
Fig. 2 is a curve representing the effective critical bandwidth of the human ear versus frequency of tone before and after frequency multiplication.

If the critical bandwidth of the human ear were constant for all frequencies, mere frequency multiplication would enhance the signal-to-noise ratio by the factor of multiplication. Since the critical bandwidth of the human ear varies with frequency, it is possible to achieve a greater improvement in low frequency signals than that due solely to the reduction of the noise per cycle if the signals are heard in more advantageous critical bandwidths. Of course, less improvement is created if the signals are heard in a less advantageous critical bandwidth. Referring to Fig. 2, curve 5, the critical bandwidth of the ear versus frequency of the desired tone is plotted wherein it is shown that the effective critical bandwidth of the human ear at 100 C. P. S. is approximately 18 db above 0 db wherein 0 db represents a bandwidth of 1 cycle per second. If the 100 C. P. S. tone is multiplied by a factor of two, the desired signal is now 200 C. P. S. Referring to curve 5, it is seen that a 2 db improvement is obtained because the signal is now located in a more advantageous critical bandwidth where the critical bandwidth is only 16 db. In addition to this gain of 2 db, by referring to curve 6 which represents the effective critical bandwidth of the ear versus frequency after a multiplication by a factor of two, it is seen that a 3 db gain is obtained because of the reduction of the noise power per cycle due to frequency multiplication as hereinbefore explained with reference to Fig. 1. Thus, moving the desired 100 C. P. S. tone to a more advantageous critical bandwidth and reducing the noise power per cycle by multiplication yields a total improvement of 5 db. From curves 7 and 8 it is seen that, using a greater factor for frequency multiplication, a greater improvement is obtained due to the great reduction of noise power per cycle.

Figure 3:
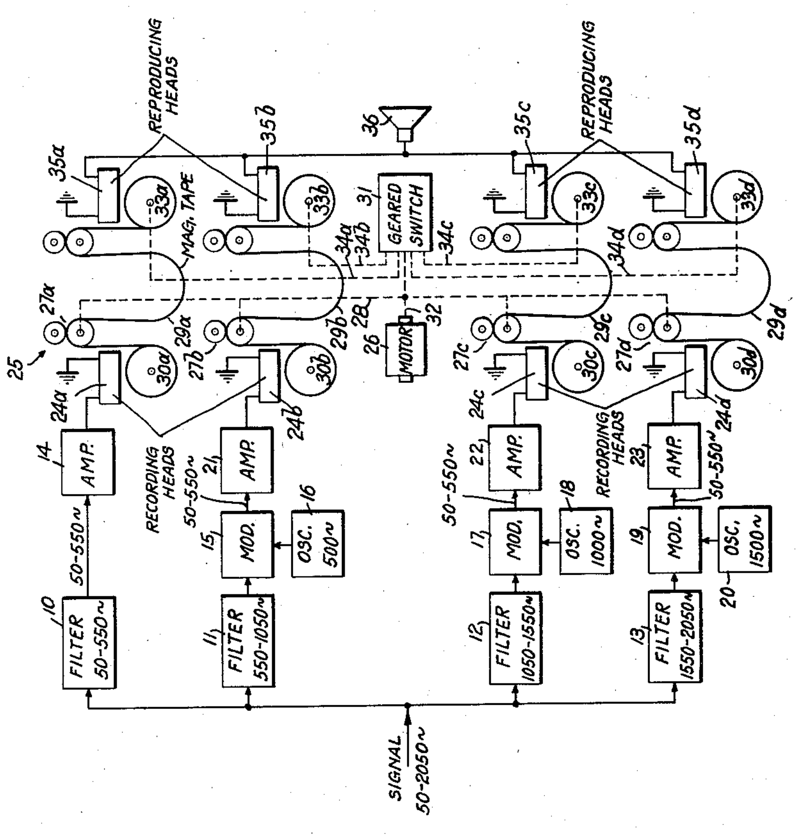
Fig. 3 is a schematic diagram in block form of one system for improving the signal-to-noise ratio of a masked tone.

Referring to Fig. 3 of the drawing, a schematic diagram in block form of apparatus for use in accordance with the principles of this invention is shown, wherein for purposes of illustration it is assumed that a frequency bandwidth of 200 C. P. S. lying between 50 and 2050 C. P. S. is to be monitored for the presence of a given tone. The input 2000 cycle bandwidth is fed to filters 10, 11, 12, and 13 to divide the input frequency band of 50–2050 C. P. S. into four sub-bands of 50–550, 550–1050, 1050–1550, and 1550–2050 C. P. S., respectively. The output of filter 10 comprising signals in the 50–550 C. P. S. range is coupled directly to amplifier 14. The output of filter 11 is fed to a modulator 15 along with a 500 cycle signal from oscillator 16 to transpose the 550–1050 C. P. S. output of filter 11 to the 50–550 C. P. S. frequency band. In a similar manner the output of filter 12 is coupled to modulator 17 along with the 1000 cycle signal from oscillator 18 to transpose the output of filter 12 to the 50–550 C. P. S. range, while the output of filter 13 is coupled to modulator 19 along with the 1500 cycle signal from oscillator 20 to transpose the 1550–2050 output of filter 13 to the 50–550 C. P. S. range. The outputs of modulators 15, 17, and 19 are fed to amplifiers 21, 22, and 23. The output of each amplifier 14, 21, 22, and 23 is coupled to the recording heads 24*a*, 24*b*, 24*c*, and 24*d* of multiple track magnetic tape recorder 25. Motor 26 drives friction pulleys 27*a*, 27*b*, 27*c*, and 27*d* via mechanical linkage 28 causing magnetic tapes 29*a*, 29*b*, 29*c* and 29*d* to unreel from storage reels 30*a*, 30*b*, 30*c*, and 30*d* at a given rate. Each of the modulated sub-bands of frequency are simultaneously recorded onto the magnetic tapes 29 by the recording heads 24. The motor 26 drives a geared switch 31 through mechanical linkage 32. The output of geared switch 31 drives each of the take-up reels 33*a*, 33*b*, 33*c*, and 33*d* in succession at four times the speed that the friction pulleys 27 are driven, but each take-up reel 33 is driven for only one-quarter of the period due to gear switch 31 which successively couples the motor 26 to linkages 34*a*, 34*b*, 34*c*, and 34*d*. Since the magnetic tape passes the reproduction heads 35*a*, 35*b*, 35*c*, and 35*d* at four times the speed of recording, the output from each reproduction head 35 will be multiplied in frequency by a factor of four. The multiplied frequency output from each of the bands is now converted into a range of 200 to (2200) C. P. S. (50–550 times four). Referring again to Fig. 1, curve 5, it is seen that advantageous critical bandwidths for the human ear lie substantially in the range of 200 to 2200 C. P. S. Thus, in this illustrative example the transposed sub-bands of frequency when multiplied lie in the most advantageous bandwidths for the human ear. The output of each of the reproduction heads are coupled to a loud speaker 36 whose output comprises an output due to each sub-band in succession.

While I have described above the principles of my invention in connection with specific apparatus, it is to be clearly understood that this description is made only by way of example and not as a limitation to the scope of my invention as set forth in the objects thereof and in the accompanying claims.

I claim:

1. A method of aural signal presentation of an audible tone in a given frequency bandwidth having a given signal-to-noise ratio and to which the human ear has a given critical bandwidth, said tone being inaudible at said given signal-to-noise ratio and said given critical bandwidth; comprising the steps of dividing a given period of said given frequency bandwidth into a plurality of sub-band signals, transposing the frequency of said sub-band signals to a common predetermined sub-band of frequencies, and multiplying each of said transposed sub-band signals by the same factor to a more advantageous critical bandwidth for said signal-to-noise ratio than said given critical bandwidth and aurally presenting said multiplied sub-band signals in succession.

2. A method of aural signal presentation of an audible tone in a given frequency bandwidth having a given signal-to-noise ratio and to which the human ear has a critical bandwidth, said tone being inaudible at said given signal-to-noise ratio and said given critical bandwidth; comprising the steps of dividing a given period $t$ of said given frequency bandwidth into $m$ sub-bands of frequencies, modulating the signal frequencies contained in each of said sub-bands to a common predetermined sub-band of frequencies, multiplying the signal frequencies of each of said predetermined sub-bands of frequencies by $m$ and aurally presenting each of said multiplied sub-bands in succession for a length of time equal to $$\frac{t}{m}$$

3. A system for the presentation of an audible tone present in a given frequency bandwidth having a given signal-to-noise ratio and to which the human ear has a critical bandwidth, said tone being inaudible at said given signal-to-noise ratio and said given critical bandwidth, comprising means to divide said given band of frequencies into a plurality of sub-bands of frequencies, means to transpose each of said sub-bands to a common predetermined frequency range, means to multiply the frequency of each of said sub-bands of predetermined frequency range by the same factor, and means for aurally presenting each of said sub-bands in succession.

4. A system according to claim 3, wherein said means to multiply includes means to record each of said sub-bands of frequencies at a given rate and means to reproduce each of said recorded sub-bands in succession at a rate equal to the recording rate times the number of sub-bands.

5. A system according to claim 3, wherein said means to transpose includes a local oscillator of predetermined frequency associated with each of said sub-bands to be transposed and a modulator to beat the output of said local oscillator with the frequencies of said associated sub-band.

References Cited in the file of this patent

UNITED STATES PATENTS

| | | |
|---|---|---|
| 1,108,895 | Fessenden | Sept. 1, 1914 |
| 2,117,739 | Miller | May 17, 1938 |
| 2,553,610 | Singleton | May 22, 1951 |
| 2,650,949 | Veaux | Sept. 1, 1953 |
| 2,705,742 | Miller | Apr. 5, 1955 |